US00H002132H

(19) United States

(12) Statutory Invention Registration

Stafford et al.

(10) Reg. No.: US H2132 H

(43) Published: Nov. 1, 2005

(54) POLYESTER CONTAINERS HAVING A REDUCED COEFFICIENT OF FRICTION

(75) Inventors: Steven Lee Stafford, Gray, TN (US); Lavonna Suzanne Buehrig, Kingsport, TN (US); Louis Thomas Germinario, Kingsport, TN (US); Eric Jon Moskala, Kingsport, TN (US); David Paul Fischer, Kingsport, TN (US); Michael Eugene Donelson, Gray, TN (US); Steven Matthew Scheffer, Burlington (CA); Darrin James Nicholson, Waterdown (CA); Maurice Harold Hodgson, Richmond (CA); Fabian Clarke Pike, Vancouver (CA); Jeff Erich Neff, Port Coquitlam (CA)

(73) Assignee: Eastman Chemical Company, Kingsport, TN (US)

(21) Appl. No.: 10/186,008

(22) Filed: Jun. 27, 2002

(65) Prior Publication Data

US 2003/0152726 A1 Aug. 14, 2003

Related U.S. Application Data

(60) Provisional application No. 60/302,160, filed on Jun. 29, 2001.

(51) Int. Cl.[7] ..... B29D 22/00

(52) U.S. Cl. ..... 428/35.7

(58) Field of Search ..... 428/35.7

(56) References Cited

U.S. PATENT DOCUMENTS

| | | | |
|---|---|---|---|
| 3,368,995 | A | 2/1968 | Furukswa et al. |
| 3,516,957 | A | 6/1970 | Gray, Jr. et al. |
| 3,624,024 | A | 11/1971 | Caldwell et al. |
| 3,859,245 | A | 1/1975 | Stieler et al. |
| 4,412,888 | A | 11/1983 | Fremont |
| 4,414,352 | A | 11/1983 | Cohen et al. |
| 4,430,468 | A | 2/1984 | Schumacher |
| 4,434,258 | A | 2/1984 | Schumacher et al. |
| 4,450,200 | A | 5/1984 | Iwato et al. |
| 4,451,606 | A | 5/1984 | Campbell |
| 4,460,731 | A | 7/1984 | Kochanowski et al. |
| 4,467,051 | A | 8/1984 | Finax et al. |
| 4,492,782 | A | 1/1985 | Williams et al. |

(Continued)

FOREIGN PATENT DOCUMENTS

| | | | |
|---|---|---|---|
| DE | 199 34 320 | A1 | 1/2001 |
| EP | 0 0258 636 | A2 | 3/1988 |
| GB | 1104089 | A1 | 8/1966 |
| JP | 45-19789 | | 7/1970 |
| JP | 62-30019 | A | 2/1987 |
| JP | 03-207748 | A | 9/1991 |
| JP | 5-104621 | A | 4/1993 |
| JP | 9-272191 | A | 10/1997 |
| WO | WO 00/52094 | A1 | 8/2000 |
| WO | WO 01/34703 | A1 | 5/2001 |

*Primary Examiner*—Michael J. Carone

(74) *Attorney, Agent, or Firm*—Bernard J. Graves, Jr.

(57) ABSTRACT

Polyester containers having a reduced coefficient of friction ("COF") are produced by increasing the surface roughness of the polyester using either thermal crystallization or solvent crystallization. Because the low COF reduces or eliminates friction between polyester containers, the containers do not become entangled and disrupt the manufacturing process. As a result, the containers move easily through typical conveying and filling lines in manufacturing processes that use the containers.

25 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

U.S. PATENT DOCUMENTS 4,504,608 A 3/1985 Kishida et al.
4,536,531 A 8/1985 Ogawa et al.
4,555,533 A 11/1985 Ambros et al.
4,607,075 A 8/1986 Baum et al.
4,643,921 A 2/1987 Terabe et al.
4,677,150 A 6/1987 Chacko et al.
4,699,942 A 10/1987 Weaver et al.
4,713,407 A 12/1987 Bailey et al.
4,795,771 A 1/1989 Yoshihara
4,820,347 A 4/1989 Weber
4,898,897 A 2/1990 Kiyohara et al.
4,908,428 A 3/1990 Bastioli et al.
4,927,874 A 5/1990 Weber
4,931,493 A 6/1990 Weber
4,948,665 A 8/1990 Rosen
4,970,256 A 11/1990 Inoue et al.
4,981,896 A 1/1991 Okada et al.
4,983,660 A 1/1991 Yoshida et al.
4,994,518 A 2/1991 Morin et al.
5,039,717 A 8/1991 Kawakami et al.
5,082,890 A 1/1992 Chou et al.
5,089,553 A 2/1992 Umeda et al.
5,090,180 A 2/1992 Sörensen
5,114,995 A 5/1992 Golder et al.
5,114,996 A 5/1992 Golder et al.
5,114,997 A 5/1992 Golder et al.
5,114,998 A 5/1992 Golder et al.
5,147,920 A 9/1992 Dekkers et al.
5,155,145 A 10/1992 Foster et al.
5,189,091 A 2/1993 Laughner
5,258,161 A 11/1993 Ealer
5,322,663 A 6/1994 Lai et al.
5,326,806 A 7/1994 Yokoshima et al.
5,360,829 A 11/1994 Kawabe et al.
5,369,154 A 11/1994 Laughner
5,391,607 A 2/1995 Fujii et al.
5,399,603 A 3/1995 Sloan et al.
5,449,722 A 9/1995 Nishida et al.
5,461,092 A 10/1995 Laughner
5,489,640 A 2/1996 Riding
5,496,880 A 3/1996 Heuseveldt et al.
5,504,130 A 4/1996 Riding
5,536,763 A 7/1996 Foran
5,571,866 A 11/1996 Nishida et al.
5,635,548 A 6/1997 Kittle et al.
5,654,347 A 8/1997 Khemani et al.
5,830,544 A 11/1998 Kerscher et al.
5,831,544 A 11/1998 Park
5,840,419 A 11/1998 Alder
5,908,890 A 6/1999 Cornett
6,020,414 A 2/2000 Nelsen et al.
6,099,789 A 8/2000 Sumi
6,147,148 A 11/2000 Tanaka et al.
6,201,041 B1 3/2001 Pasbrig et al.
6,277,899 B1 8/2001 Bastioli et al.
6,281,283 B1 8/2001 Heitz et al.
6,323,271 B1 11/2001 Caldwell et al.
6,359,052 B1 3/2002 Trexler, Jr. et al.
6,362,269 B1 3/2002 Ishihata et al.
2003/0001317 A1 * 1/2003 Stafford et al. ..... 264/532

* cited by examiner

POLYESTER CONTAINERS HAVING A REDUCED COEFFICIENT OF FRICTION

CROSS REFERENCE TO RELATED APPLICATIONS

This application claims priority to U.S. Provisional application Ser. No. 60/302,160, filed Jun. 29, 2001, the disclosure of which is incorporated herein by this reference.

BACKGROUND OF THE INVENTION

1. Field of the Invention

This invention relates to polyester containers having a reduced coefficient of friction and methods for making such containers.

2. Description of the Prior Art

Problems exist in conveying various types of polyester containers due to the excessive amount of static friction encountered when container surfaces contact. This excessive friction can lead to "process line" or "filling line" interruptions that are economically undesirable. The problem occurs after the polyester polymer has been molded into preforms or stretch-blown into various types of containers. The containers are sometimes conveyed directly into a palletizing station and then shipped to a filling plant or they are conveyed to a labeling and filling line contained within the same plant. This problem is more pronounced in the carbonated softdrink ("CSD") industry due to the high speed of stretch-blow molding conveying and filling lines. The problem is also encountered in other parts of the polyester container industry where the containers are being conveyed under pressures applied from congested areas of the conveying process.

During the process of blowing and filling stretch-blow molded polyester containers it is necessary and common to convey the containers along conveyor belts or rails. For example, the containers are typically moved from stretch-blow molding machines to a palletizer and loaded in some formation such as 15×15 array onto a cardboard layer. Then, the layers are stacked several layers high before the entire stack is shrink-wrapped for shipment to a filling line. Alternatively, the containers are depalletized by taking them off the pallet and moving them onto a conveyor line and through the labeling and filling process. During these processes, the containers have a tendency to stick together and cause line jams as they proceed to the filler or labeler or stick together and cause gaps in the formation required for the palletization process. Also, the pressure between the individual containers is at its greatest and any gaps that form are hard to eliminate due to these pressures and the friction between the containers.

Certain container types (e.g., two liter poly (ethyleneterephthalate) ("PET") CSD bottles) are essentially straight-walled and have a very smooth surface that gives the container an appealing appearance. However, the very smooth, flat surface of the container maximizes the surface which comes in contact between two adjacent containers. With the inherently high COF polyester containers such as PET (PET has a static COF greater than 1.0), the containers become entangled and "tip over" or just stop moving in the conveying line after blowing, during filling, enroute to the palletizer, or enroute from the depalletizer to the labeling and filling station. Such tip over and stoppage obviously causes undesirable disruptions in the conveying or filling process.

A high COF prevents adjacent containers on a multiple-row conveying line from moving (turning or slipping) during conveying. When the conveying line changes direction, sometimes as much as 90 degrees, the containers may become entangled and either stay upright and stop the feed or tip over and stop the line. In either event, someone has to monitor these problem areas at all times to keep the line moving. Therefore, a container having a low static COF that could slide and rotate against other containers during conveying would minimize or eliminate process downtime and the need for someone to constantly monitor the process.

There exists prior art in the area of thermal crystallization of the preform and bottle prior to and during the stretch-blow process. However, such art does not disclose any reduction in the bottle sidewall COF nor any improvement in "bottle stickiness." JP 3207748 and JP 216081 disclose adding a small amount of polyamide nucleator to improve crystallization throughout the entire thickness of the bottle during the heat-set process to improve thermal stability. U.S. Pat. No. 5,090,180 discloses crystallizing the entire thickness of the base by thermal means during the stretch-blow process to improve thermal and mechanical stability of the bottle. JP 62030019 discloses reducing internal residual strain in a two stage stretch-blow process by thermally crystallizing the entire bottle before the second stretch-blow step, yielding a bottle with a low degree of haze. JP 58119829 discloses passing the preform through a flame treatment to melt the surface, causing some thermal crystallization, and reducing surface defects without imparting haze.

There is prior art in the area of solvent crystallization of PET to improve the thermal stability of PET bottles. However, this art does not disclose the use of solvent crystallization of the preform or bottle surface to decrease the container sidewall COF. JP 56150516 and JP 53110669 disclose that the neck and mouth of the bottle, after the stretch-blow process, can be solvent crystallized to improve solvent-crack resistance in the bottle without increasing the haze level in those regions.

None of the above cited prior art disclose selectively treating only a portion of the preform or container wall to reduce the COF and improve the handling properties of the container. There is, therefore, a need for new and improved containers having a reduced COF, particularly low haze (high clarity) containers that have a reduced COF, and for processes for producing such containers.

SUMMARY OF THE INVENTION

It is, therefore, an object of the invention to provide polyester containers having a reduced coefficient of friction ("COF").

It is another object of the invention to provide polyester containers having an increased surface roughness.

It is a further object of the invention to provide polyester containers having a low haze (high clarity).

It is another object of the present invention to provide processes for producing polyester containers having a reduced COF, increased surface roughness, and low haze (high clarity).

It is a further object of the invention to provide polyester containers that do not cause undesirable interruptions in the conveying and filing lines using the containers.

These and other objects are achieved using novel polyester containers having a reduced COF. The reduced COF is obtained by increasing the surface roughness of the polyester container sidewall using thermal crystallization or solvent crystallization. The processes cause crystallization of the container surface, increase the roughness of the surface, and decrease the likelihood that the containers will interact to adversely affect the conveying and filling of the containers in the manufacturing process. Surprisingly, the processes achieve the objects of the invention without causing undesirable haze in the container. In a preferred embodiment, the processes are used to produce PET containers with a reduced COF, typically bottles for containing carbonated beverages made entirely of PET or of a hard polymer base and PET body. Such containers can be used to package various foods and beverages.

Other and further objects, features and advantages of the present invention will be readily apparent to those skilled in the art.

DETAILED DESCRIPTION OF THE INVENTION

In one aspect, the present invention provides polyester containers having a reduced coefficient of friction ("COF"). The reduced COF is obtained by increasing the surface roughness of the polyester in the container using thermal crystallization or solvent crystallization.

In another aspect, the present invention provides processes for increasing the surface roughness of polyester and reducing the COF of the polyester and any containers made using the polyester. The surface roughness is increased using thermal treatment of the preform that is used to produce the containers or by chemical treatment of the preform or the formed container.

In one embodiment, the surface roughness of the container is increased using a thermal treatment process that causes crystallization of the container preform surface before or during the stretch-blow process used to produce the container. In this process, the thermal gradient must be controlled such that the heat required to accomplish crystallization is not absorbed deeply into the thickness of the preform. If the thermal gradient is not controlled undesirable haze will develop and the container will have poor mechanical orientation resulting in insufficient strength properties.

Figure 1:
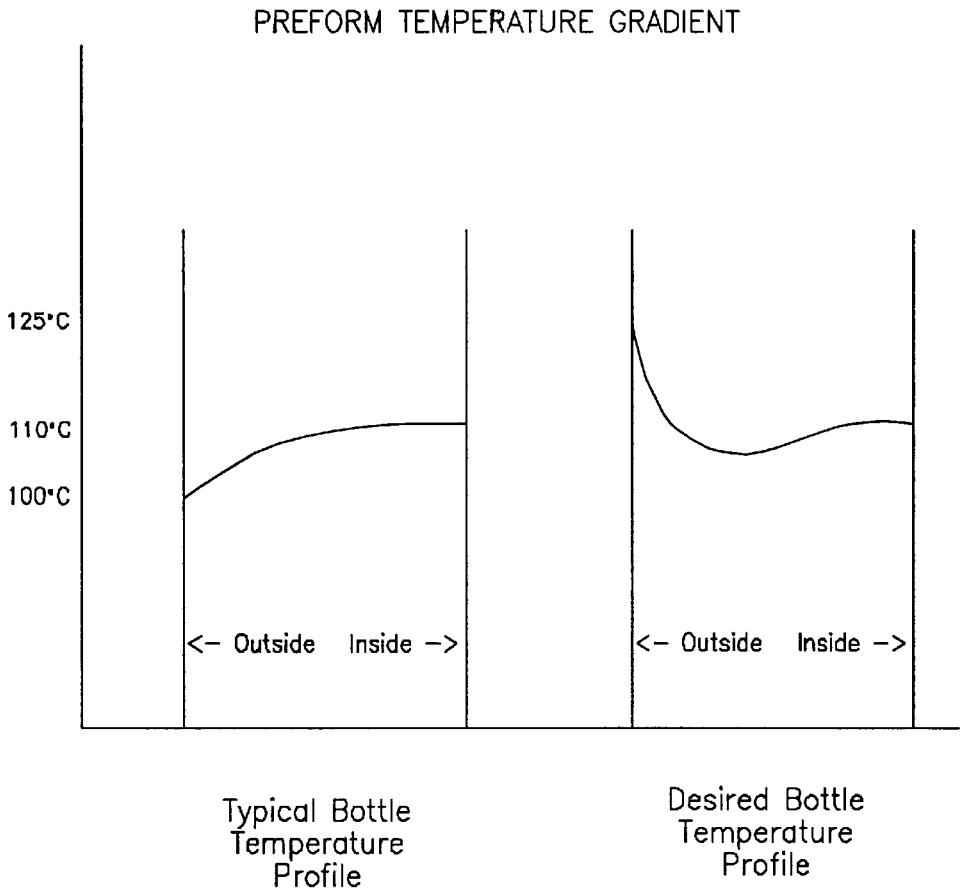
FIG. 1 shows the approximate temperature gradient for a conventional carbonated soft drink preform just before blowing (on the left) and of the preform just before blowing according to the present invention (on the right).

The graph on the right of FIG. 1 (Desired Bottle Temperature Profile) shows the type of temperature gradient that is preferred to accomplish this thermal surface crystallization without creating undesirable haze. The temperature of the preform surface should be near or above about 120° C. after exiting the stretch-blow machine oven bank. The remainder of the preform bulk should be near or below about 110° C. This type of gradient is very different from the temperature gradient used to reheat conventional CSD container preforms. The temperature range which begins where a polymer begins to form thermal crystallization is the thermal haze region. In the present invention, it is desirable to heat the preform exterior surface to a temperature which is near or in the lower end of the thermal haze region for the selected polyester. However, for conventional CSD blow molding processes, the reheat temperature of the preform is near the pearlescence point which is a temperature just below or at the minimum stretch temperature for the selected polyester polymer. Generally, the thermal haze region begins about 20 to 30° C. above the pearlescence point. Preferably, the temperature of the preform exterior surface is heated to a temperature about 10° C. above the pearlescent point and the remainder of the preform is heated to a temperature about the pearlescent point for the polyester.

In a preferred embodiment, PET preforms are heated in a conventional stretch-blow machine oven bank such that the temperature of the preform surface is about 120° C. and the remainder of the preform bulk is about 110° C. after exiting the oven. The resulting preform, with a crystallized surface, is subsequently stretch-blown into beverage containers.

It has been surprisingly found that this process alters the surface of the preform to increase surface roughness without imparting an undesirable level of haze in the container. Containers formed from the process of the present invention display greatly decreased friction. These containers are useful because they provide a significant reduction in the tendency of adjacent containers to stick together during the conveying and filling processes that use the containers.

The surface roughness imparted by the process of the present invention is similar to that obtained with the addition of antiblocks. However, the present process does not cause the undesirable haze characteristic of antiblock addition processes. The process of the present invention yields containers having a surface roughness of at least about 10 nanometers (nm), preferably from about 10 to about 80 nanometers, more preferably from about 15 to about 60 nm. The desirable upper surface roughness limit of about 80 nm is set by acceptable container haze levels. Typically, a container with 80 nm root mean square ("RMS") roughness has a 5% haze level. The containers produced by the present invention have a haze level of from about 0.1% to about 5%, preferably from about 0.1% to about 3%.

Although not bound by theory, it is believed that the surface roughness is caused by selectively crystallizing the low molecular weight species on and in the preform or container surface. The depth of the crystallinity within the container thickness is not critical so long as the haze of the final container's sidewall does not exceed about 5%, preferably about 3%.

The amount of surface roughness imparted to the surface can be controlled by the exposure time and conditions selected. Conventional quartz lamps used in commercial stretch-blow equipment provide radiation that penetrates throughout the entire thickness of the preform. Thus, increasing the lamp power increases preform temperature homogeneously throughout the thickness of the preform. Excessive heat across the entire preform thickness results in a container with poor burst properties. However, it has been found that by controlling the lamp power and reducing ventilation during reheating, surface temperature of the preform may be selectively increased. If correctly done, this will create a temperature gradient that will impart surface roughness yet maintain enough orientation to obtain good container strength. In one embodiment, good results were achieved by decreasing the ventilation by as much as about 50% while maintaining the lamp power and exposure time. Those of skill in the art will be able to recognize that many combinations of ventilation, lamp power, and exposure time may be used to achieve the desired result.

Another method useful for producing the desired temperature gradient is to add an external heater that increases only surface temperature. The external heater may be positioned after the last oven bank before the preform is transferred to the blow station. Preferably the external heater will increase the surface temperature by about 10° C. to 20° C. without having a substantial effect on the temperature gradient across the thickness of the preform. Suitable external heat sources include a hot air blower, a cal-rod heater, superheated steam, quartz lamps at a very low voltage, combinations thereof, and other known heating devices. The addition of an external heater provides "surface-only" heating that accomplishes the crystallization just before blowing without causing a reduction in container strength properties or an increase in container haze.

Figure 2:
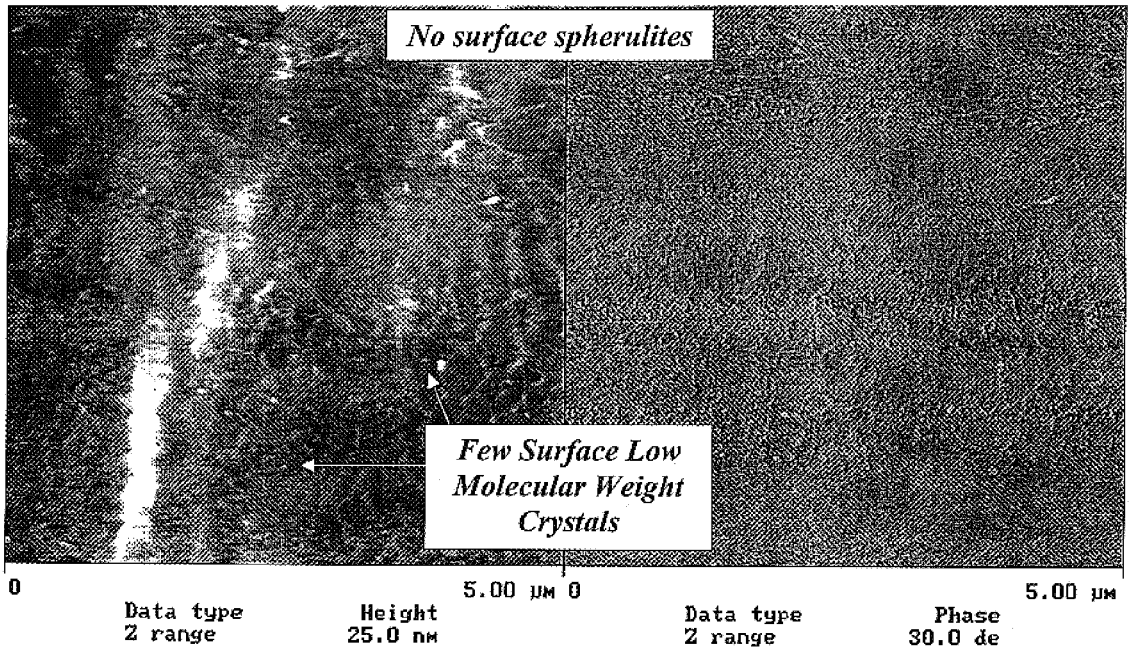
FIG. 2 shows a photomicrograph of a conventional bottle sidewall surface without surface crystallization.
Figure 3:
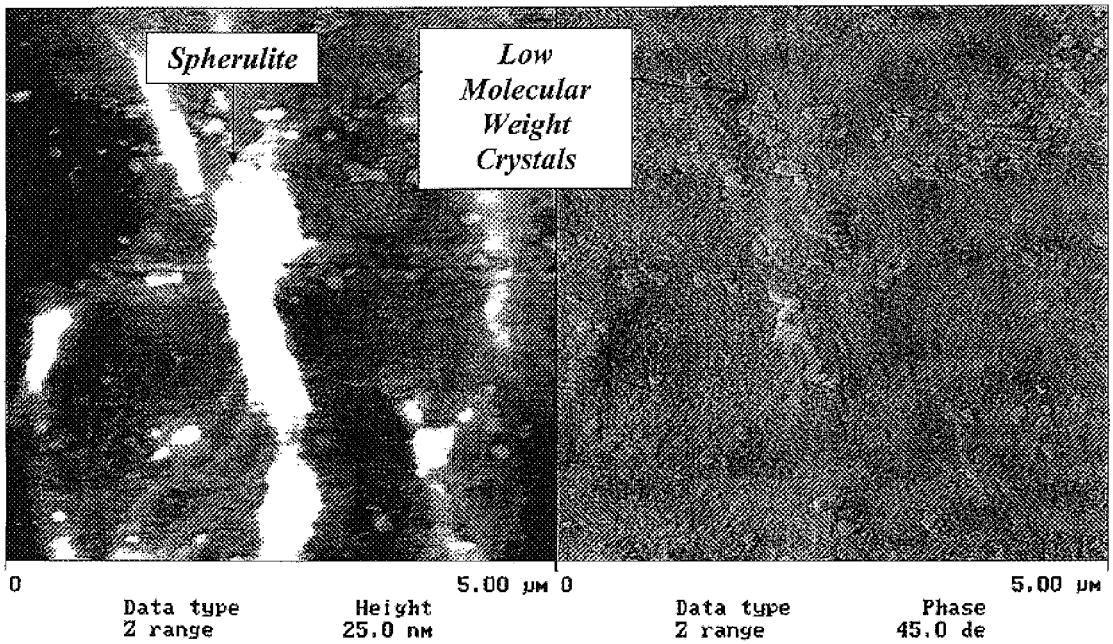
FIG. 3 shows a photomicrograph of bottle sidewall surface with surface crystallization.

Thermal treatments of the present invention provide improved surface roughness. This surface roughness is readily seen in photomicrographs such as those shown in FIGS. 2 and 3. FIG. 2 shows a photomicrograph of the sidewall exterior surface of a conventional carbonated soft drink container (preform skin temperature just before blowing of about 105° C. to about 110° C. The surface is relatively smooth and displays no deep, broad valleys. The surface roughness of the container of FIG. 2 is 4 microns. FIG. 3 shows a photomicrograph of a bottle sidewall with surface crystallization caused by temperature crystallization according to the present invention. The micrographs show undulating surfaces with many deep, wide valleys. The surface roughness for the container in FIG. 3 is about 15 RMS.

The normal static COF for a conventional CSD PET container (typically a bottle) sidewall is greater than 1.0 and sometimes greater than 1.5. After thermal treatment according to the present invention, the COF of the final stretch-blown container is reduced to from about 0.01 to about 1.0, preferably from about 0.05 to about 0.5.

In another embodiment, the surface roughness of the container is increased using a chemical crystallization process. The roughness is increased by contacting a preform or container with a solvent that interacts strongly enough with polyester to reduce its glass transition temperature to ambient conditions and cause crystallization at the surface.

The solvent can be contacted with or applied to the surface by dipping the preform in the solvent, spraying, misting, applying the solvent with a sponge, or other convenient method. Excess solvent may be flash vaporized before entering the reheat ovens for stretch-blow molding. The solvent may be applied to all or a portion of the preform body.

Examples of suitable solvents include ketones, esters, ethers, chlorinated solvents, nitrogen containing solvents and mixtures thereof. Specific examples of suitable solvents include acetone, methyl acetate, methyl ethyl ketone, tetrahydrofuran, cyclohexanone, ethyl acetate, N,N dimethylformamide, dioctyl phthalate, toluene, xylene, benzene, dimethylsulfoxide, mixtures thereof, and the like. Preferred solvents include acetone, methyl ethyl ketone, cyclohexanone, methyl acetate, ethyl acetate, dimethylsulfoxide, and mixtures thereof. The most preferred solvent is acetone.

The amount of surface roughness generated and the depth of crystallization across the container thickness can be controlled by controlling the amount of time exposed to the solvent, the solvent selected, and the temperature of the preform and/or solvent. If the exposure time is too long, the solvent will penetrate too deeply into the preform and crystallites will form below the surface causing undesirable haze. Selection of the solvent, solvent contact time, and solvent temperature are within the skill level of skilled artisans. Contact times ranging up to about 10 seconds and preferably up to about 3 seconds are suitable. It should be appreciated that shorter times are required for more reactive solvents. In acetone, only 0.1 to about 3 seconds, preferably about 1 or 2 seconds, are required at room temperature to crystallize the surface without causing haze. Removal of the solvent may be necessary so that the solvent does not penetrate further than needed to develop the desired surface roughness. If it is allowed to penetrate too deeply, then undesirable haze can develop without additional decrease in COF. Excess solvent may be removed via evaporation, flash vaporization, washing, or other suitable method for the particular solvent.

The normal static COF for a PET container (typically a bottle) sidewall is greater than about 1 and sometimes greater than about 1.5. After contact with the solvent, the COF of the final stretch-blown container is reduced to less than about 0.50.

Any polyester that can be used to form a suitable container via a two stage stretch-blow molding process may be used in the present invention. The polyesters are any crystallizable polyester homopolymer or copolymer that are suitable for use in packaging, and particularly food packaging. Suitable polyesters are generally known in the art and may be formed from aromatic dicarboxylic acids, esters of dicarboxylic acids, anhydrides of dicarboxylic esters, glycols, and mixtures thereof. More preferably the polyesters are formed from repeat units comprising terephthalic acid, dimethyl terephthalate, isophthalic acid, dimethyl isophthalate, dimethyl-2,6-naphthalenedicarboxylate, 2,6-naphthalenedicarboxylic acid, ethylene glycol, diethylene glycol, 1,4-cyclohexane-dimethanol, 1,4-butanediol, and mixtures thereof. Preferred polyesters are poly (ethyleneterephthalate) ("PET"), poly(ethylenenaphthalate) ("PEN"), poly(ethyleneisophthalate) ("PIT"), and poly (ethylenebutyleneterephthalate), with PET being the most preferred.

The dicarboxylic acid component of the polyester may optionally be modified with up to about 15 mole percent of one or more different dicarboxylic acids. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid are: phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, mixtures thereof and the like.

In addition, the glycol component may optionally be modified with up to about 15 mole percent, of one or more different diols other than ethylene glycol. Such additional diols include cycloaliphatic diols preferably having 6 to 20 carbon atoms or aliphatic diols preferably having 3 to 20 carbon atoms. Examples of such diols include: diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane, mixtures thereof and the like. Polyesters may be prepared from two or more of the above diols. Preferred polyesters are poly(ethyleneterephthalate) ("PET"), poly (ethylenenaphthalate) ("PEN"), poly(ethyleneisophthalate) ("PIT"), and poly(ethylenebutyleneterephthalate), with PET being the most preferred.

The polyester may also contain small amounts of trifunctional or tetrafunctional comonomers such as trimellitic anhydride, trimethylolpropane, pyromellitic dianhydride, pentaerythritol, and other polyester forming polyacids or polyols generally known in the art.

Additives normally used in polyesters may be used if desired. Such additives include, but are not limited to colorants, toners, pigments, carbon black, glass fibers, fillers, impact modifiers, antioxidants, stabilizers, flame retardants, reheat aids, acetaldehyde reducing compounds, oxygen scavengers, barrier enhancing aids and the like.

The container of the invention can be a container made entirely of polyester or can be a container having polyester as a portion of the container, e.g., a beverage bottle having a polymer base and a polyester body. A two-liter CSD beverage bottle having a polyethylene base and a PET upper body illustrates the invention. The PET used to make the bottle is treated according to the present invention to produce a PET having a low COF. The resulting bottles move easily through the conveying and filling lines in the manufacturing process because of the low COF in the surface area that contacts the other bottles during this transport process This invention can be further illustrated by the following examples of preferred embodiments thereof, although it will be understood that these examples are included merely for purposes of illustration and are not intended to limit the scope of the invention unless otherwise specifically indicated.

Examples 1 through 3 and Comparative Example 1 (Solvent Treatments)

Two-liter preforms formed from EastaPak CB-12 PET (commercially available from Eastman Chemical Company) were immersed, in the upright position, up to the support ring into a beaker of acetone and held in the acetone for 1, 5, and 10 seconds. The preforms were removed from the solvent. Residual solvent on the preforms was flash vaporized immediately afterwards. The preforms were then stretch-blown on a SIDEL 2/3 for a normal one-stage, stretch-blow process conditions (oven power at pearlescent point plus 2%, 70% ventilation). These preforms were immediately tested for bottle sidewall haze and COF. Bottle sidewall haze was measured using a HunterLab Colorimeter by ASTM D-1003. Coefficient of friction was measured by mounting two bottles perpendicular and in contact with each other, turning one bottle and measuring torque required to turn the second bottle. The coefficient of friction was calculated as $\mu$=(Torque/R)/$F_2$, where Torque is the output of the torque-sensing device, R is the bottle radius, and $F_2$ is the actual load or force experienced by the bottles at their contact point. A 2 liter container made from the same material, but which was not contacted with solvent was also tested. The results are shown in Table 1.

TABLE 1

| Example | Solvent | Time in Solvent (seconds) | Bottle Sidewall Static COF | Bottle Sidewall Haze |
|---|---|---|---|---|
| CE 1 | None | 0 | 1.3 | 0.57 |
| 1 | Acetone | 1 | 0.56 | 2.5 |
| 2 | Acetone | 5 | 0.43 | 2 |
| 3 | Acetone | 10 | 0.61 | 1.9 |

Referring to Table 1, the results show that solvent treatment of the polyester decreased the sidewall static COF while causing only a minor and acceptable change in haze. The static COF for the samples treated with acetone in accordance with the present invention is 50 to 60% lower than the container which was not treated, as shown particularly by Comparative Example 1 ("CE 1").

Examples 5 through 8 and Comparative Example 2

Twenty-ounce EastaPak CB-12 PET preforms were inserted "base-first up to the support ring" into acetone and held for 5, 10, and 15 seconds, then the solvent flash vaporized. The preforms were then stretch-blown in a SIDEL 2/3 using conventional one-stage, stretch-blow conditions (oven power at pearlescent point plus 2%, 70% ventilation). A control, which had not been exposed to acetone (Comparative Example 2) was blown using the same conditions. The resulting containers were immediately tested for bottle sidewall COF as described in Examples 1 to 4. The results are shown in Table 2.

TABLE 2

| Example | Solvent | Time in Solvent (seconds) | Bottle Sidewall Static COF | Bottle Sidewall Haze |
|---|---|---|---|---|
| CE 2 | none | 0 | .62 | |
| CE 2 | none | 0 | 0.61 | 1.4 |
| 5 | acetone | 5 | 0.16 | 1.7 |
| 6 | acetone | 10 | 0.16 | 1.5 |
| 7 | acetone | 15 | 0.19 | 2.3 |

Referring to Table 2, the results show improved COF for 20 ounce bottles as well as 2 liter bottles.

Comparative Examples 3 through 7

Twenty ounce EastaPak CB-12 PET preforms were prepared containing a between 0 and 0.1 wt % 5 micron Imsil A-10 (amorphous silica). The preforms were then stretch-blown in a SIDEL 2/3 using 1 one-stage, stretch-blow conditions listed in Example 1. The resulting containers were immediately tested for bottle sidewall COF as described in Examples 1 to 4. The results are shown in Table 3.

TABLE 3

| Example | Wt % amorphous silica | Bottle Sidewall Static COF | Bottle Sidewall Haze |
|---|---|---|---|
| CE 3 | 0 | 1.44 | 1.07 |
| CE 4 | 0.0125 | 0.76 | 5.28 |
| CE 5 | 0.025 | 0.36 | 9.95 |
| CE 6 | 0.05 | 0.32 | 20.31 |
| CE 7 | 0.1 | 0.28 | 33.53 |

Referring to Table 3, the results show that the use of amorphous silica provides good improvement in COF but very significant increases in bottle sidewall haze. Comparing the data from Table 2, it can be seen that the present invention provides significant decreases in bottles sidewall COF with much less haze. In fact, the highest haze level displayed (Example 7—2.3%) is half as much as the haze level for the lowest amorphous silica loading (Comparative Example 4).

Examples 8 and 9 and Comparative Examples 8 and 9 (Thermal Treatments)

Two-liter preforms of Eastapack CB-12 PET resin were injection molded on a Husky XL-225 injection molding machine. The preforms were then stretch-blown on a SIDEL SBO-2/3 machine. Three different oven set-ups were used to blow the bottles to create different skin temperatures. The oven setups were (a) a conventional CSD setting (same as used in Example 1), (b) conventional setting with reduced ventilation (decrease from 70% to 35%), and (c) conventional heat settings for CSD containers with reduced ventilation (decreased from 70% to 35%) and an external heating source, i.e., a 1500 watt hot air gun set at full power. Bottles were blown and tested immediately for bottle sidewall COF, sidewall haze, burst, percent expansion,, and section weights. COF and sidewall haze were measured as described in Examples 1 to 4. Percent expansion was determined on an AGR machine and were tested by ramping the pressure from 0 to 135 pounds per square inch (psi) and holding for 13 seconds, at which point the % expansion was determined. Burst pressure was determined on the same instrument by continuing the pressure ramp up until the bottle burst. Section weights were determined by cutting the base and top sections from the sidewall section and weighing the sidewall section. Preform skin temperature was measured using an infrared pyrometer contained within the Sidel machine, positioned about 2 feet beyond the end of the reheat oven. The results are shown in Table 4.

TABLE 4

| Example | Oven Set up | Preform Skin Temp (° C.) | % Exp at 13 sec | Burst Pressure (LL = 130 psi) | Static COF | % Haze |
|---|---|---|---|---|---|---|
| CE 8 | (a) | 112 | 7.9 | 188.5 | 1.34 | 1 |
| CE 9 | (a) | 112 | 7.6 | 189.3 | 1.35 | 0.93 |
| 8 | (b) | 119 | 9.5 | 163 | 0.478 | 1.13 |
| 9 | (c) | 127 | 12.5 | 152 | 0.16 | 4.49 |

Referring to Table 4, the results show that a 2.5 to 3 times improvement in bottle sidewall static COF was obtained when increasing the skin temperature from about 112° C. to about 120° C (Example 8) as measured by the temperature sensors. It should be understood that these temperatures are relative, not actual, and are highly dependant on the location of the infrared temperature gun outside the oven bank. Bottle orientation properties (percent expansion and burst pressure) are starting to decrease slightly with increasing preform skin temperature, however, there was no increase in bottle sidewall haze.

The containers that were prepared by the process of the present invention (Example 9) display COF which is reduced 8 to 10 times compared to conventionally blown containers. Although orientation properties decreased, they are still above the general requirements for CSD containers. Even at the highest temperature, bottle sidewall haze is within acceptable limits.

Although all three methods, i.e., addition of antiblock, surface solvent crystallization, and surface thermal crystallization, will sufficiently reduce bottle sidewall COF, solvent crystallization or thermal crystallization are preferred because they produce containers with low levels of haze.

In the drawings and specification, there have been disclosed typical preferred embodiments of the invention and, although specific terms are employed, they are used in a generic and descriptive sense only and not for purposes of limitation, the scope of the invention being set forth in the following claims. Obviously many modifications and variations of the present invention are possible in light of the above teachings. It is therefore to be understood that within the scope of the appended claims the invention may be practiced otherwise than as specifically described.

What is claimed is:

1. A process for producing a polyester container having a reduced coefficient of friction, comprising:

providing a polyester preform having an exterior surface;

treating the preform exterior surface to increase surface roughness using a process selected from the group consisting of thermal crystallization and chemical crystallization; and stretch-blow molding the treated preform into a container.

2. The process of claim 1 wherein the container has a surface roughness of from about 10 to about 80 nanometers, a coefficient of friction from about 0.01 to about 1.0, and a haze of from about 0.1% to about 5%.

3. The process of claim 1 wherein the container has a surface roughness of from about 15 to about 60 nanometers, the coefficient of friction of the polyester in the container is from about 0.05 to about 0.5, and the haze level of the polyester container is from about 0.1% to about 3%.

4. The process of claim 1 wherein the process for treating the exterior surface is thermal crystallization.

5. The process of claim 4 wherein the preform exterior surface is heated to a temperature near or in the lower end of the thermal haze region for the polyester.

6. The process of claim 4 wherein the temperature of the preform exterior surface is heated to a temperature about 10° C. above the pearlescent point of the polyester and the remainder of the preform is heated to a temperature about the pearlescent point of the polyester.

7. The process of claim 4 wherein the temperature of the preform exterior surface is heated to above about 120° C. and the remainder of the preform is heated to below about 110° C.

8. The process of claim 1 wherein the process for treating the exterior surface is chemical crystallization.

9. The process of claim 8 wherein the exterior surface is treated with a chemical selected from the group consisting of ketones, esters, ethers, chlorinated solvents, nitrogen containing solvents, and mixtures thereof.

10. The process of claim 8 wherein the exterior surface is treated with a chemical selected from the group consisting of acetone, methyl acetate, methyl ethyl ketone, tetrahydrofuran, cyclohexanone, ethyl acetate, N,N dimethylformamide, dioctyl phthalate, toluene, xylene, benzene, dimethylsulfoxide, and mixtures thereof.

11. The process of claim 8 wherein the exterior surface is treated with a chemical selected from the group consisting of acetone, methyl ethyl ketone, cyclohexanone, methyl acetate, ethyl acetate, dimethylsulfoxide, and mixtures thereof.

12. The process of claim 8 wherein the exterior surface is treated with a chemical for from about 1 to about 10 seconds.

13. The process of claim 8 wherein the exterior surface is treated with acetone.

14. The process of claim 13 wherein the exterior surface is treated with acetone for from about 0.2 to about 3 seconds at room temperature.

15. A polyester container made according to the process of claim 1.

16. A polyester container having a reduced coefficient of friction, comprising:

polyester that has been treated to increase the surface roughness of the polyester using a process selected from the group consisting of thermal crystallization and chemical crystallization.

17. The container of claim 16 wherein the surface roughness of the polyester in the container is from about 10 to about 80 nanometers, the coefficient of friction of the polyester in the container is from about 0.01 to about 1.0, and the haze level of the polyester container is from about 0.1% to about 5%.

18. The container of claim 16 wherein the surface roughness of the polyester in the container is from about 15 to about 60 nanometers, the coefficient of friction of the polyester in the container is from about 0.05 to about 0.5, and the haze level of the polyester container is from about 0.1% to about 3%.

19. The container of claim 16 wherein the polyester is selected from the group consisting poly (ethyleneterephthalate), poly(ethylenenaphthalate), poly (ethyleneisophthalate), and poly (ethylenebutyleneterephthalate).

20. The container of claim 16 wherein the polyester is poly(ethyleneterephthalate).

21. The container of claim 16 wherein the polyester comprises only a portion of the container.

22. The container of claim 16 wherein the polyester has been treated to increase the surface roughness of the polyester using thermal crystallization.

23. The container of claim 16 wherein the polyester has been treated to increase the surface roughness of the polyester using chemical crystallization.

24. A polyester preform useful for producing a polyester container having a reduced coefficient of friction, comprising:

a polyester preform that has been treated to increase the surface roughness of the polyester using a process selected from the group consisting of thermal crystallization and chemical crystallization.

25. A process for producing a polyester having a reduced coefficient of friction, comprising:

treating the surface of the polyester to increase surface roughness using a process selected from the group consisting of thermal crystallization and chemical crystallization.

* * * * *